Nov. 27, 1951  L. C. HAMMOND  2,576,340
SAW GAUGE
Filed May 10, 1946  2 SHEETS—SHEET 1
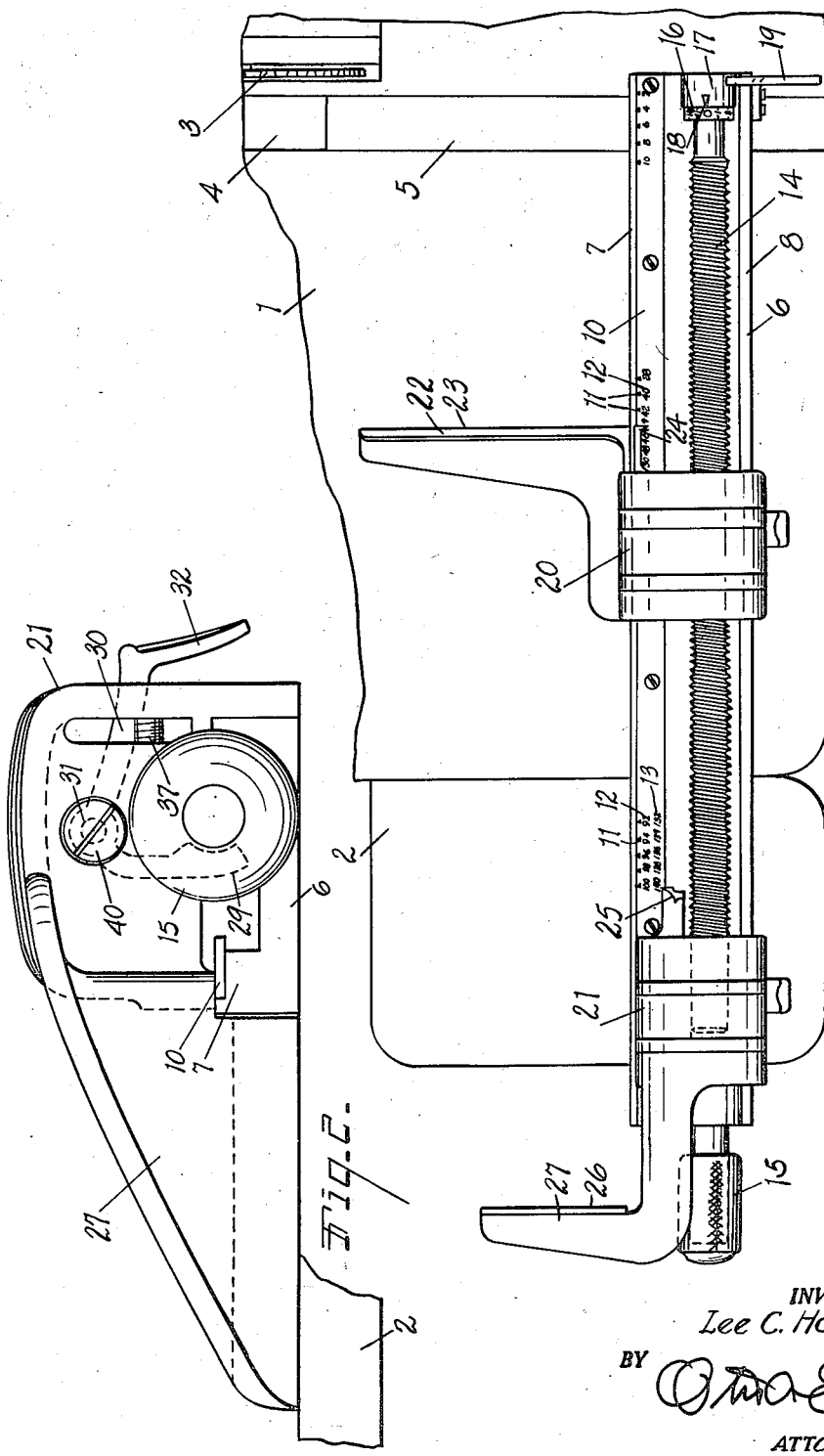
INVENTOR.
Lee C. Hammond
BY 
ATTORNEY.

Nov. 27, 1951  L. C. HAMMOND  2,576,340
SAW GAUGE
Filed May 10, 1946  2 SHEETS—SHEET 2
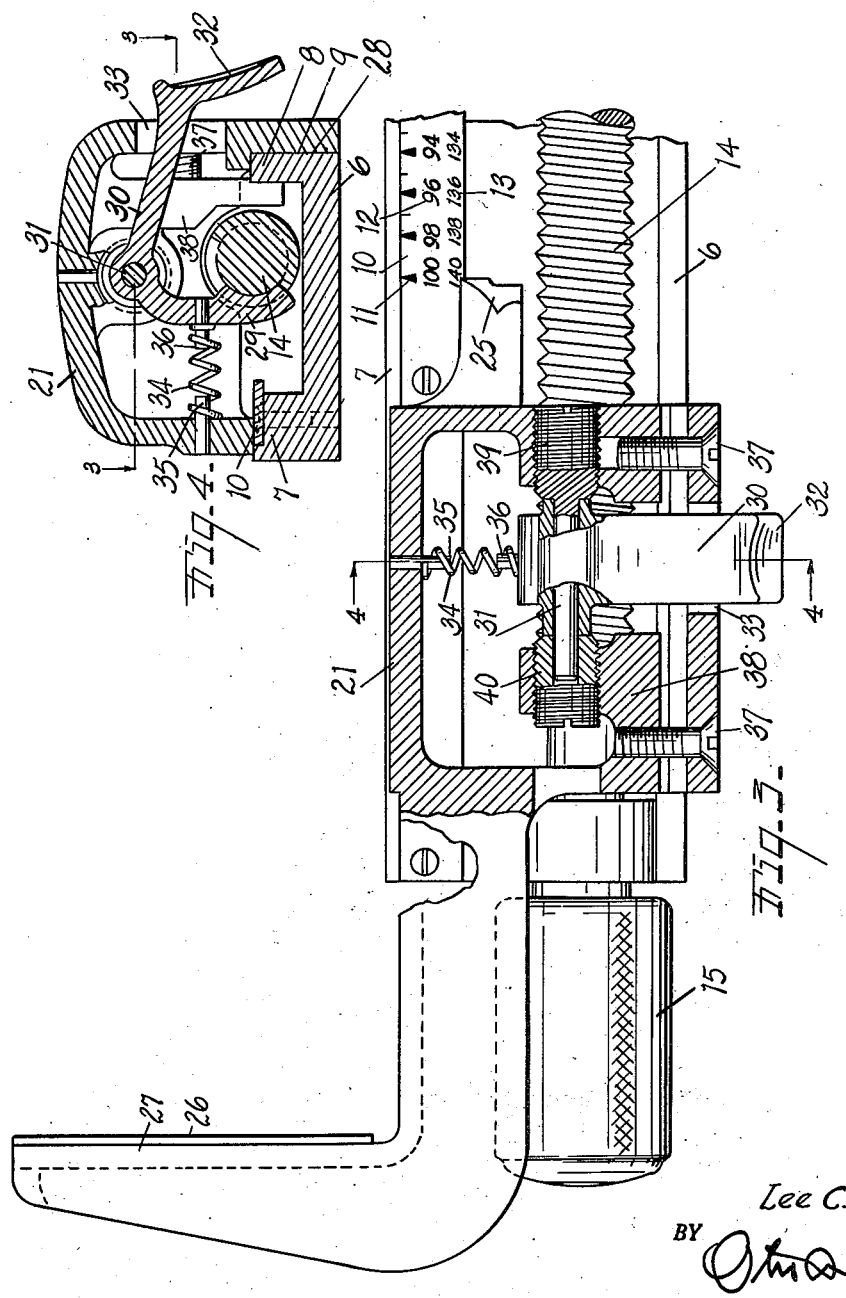
INVENTOR.
Lee C. Hammond
BY
ATTORNEY

Patented Nov. 27, 1951

2,576,340

UNITED STATES PATENT OFFICE 2,576,340

SAW GAUGE

Lee C. Hammond, Kalamazoo, Mich., assignor to Hammond Machinery Builders, Inc., Kalamazoo, Mich., a corporation of Michigan Application May 10, 1946, Serial No. 668,742

6 Claims. (Cl. 29—69)

The main objects of this invention are:

First, to provide a saw gauge which is well adapted for cutting and trimming electrotypes and printing plates which has a wide range of adjustment.

Second, to provide a saw gauge having a plurality of gauge finger slides which may be selectively associated with the gauge bar for providing a wide range in its gauging capacity.

Third, to provide a saw gauge in which the saw gauge finger slide is detachably mounted on the gauge bar and releasably engaged with the feed screw thereof to permit quick adjustment of the slide and also provide micrometer adjustment.

Objects relating to details and economies of the invention will appear from the description to follow. The invention is defined and pointed out in the claims.

A preferred embodiment of the invention is illustrated in the accompanying drawings, in which:

Fig. 1 is a fragmentary plan view of a saw structure embodying my invention, parts being shown conventionally.

Fig. 2 is an enlarged fragmentary view viewed from the left of Fig. 1.

Fig. 3 is an enlarged fragmentary view partially in horizontal section on a line corresponding to line 3—3 of Fig. 4 illustrating details common to both gauge finger slides and certain details of the auxiliary gauge finger slide, also illustrating certain novel features of the gauge bar.

Fig. 4 is a transverse section on a line corresponding to line 4—4 of Fig. 3.

In the accompanying drawings, 1 represents a saw table and 2 an extension thereof. The saw is indicated at 3. The table is provided with a way 4 for the gauge bar slides 5. The gauge bar 6 is of inwardly facing channel cross section providing a rear way 7 and a front way 8, the front way having a forwardly facing bearing surface 9.

The gauge bar is provided with an indicia element 10 having pica scale graduations 11 thereon and a primary set of scale numerals 12 running up to one hundred. It is also provided with a secondary set of scale numerals 13 associated with the same scale graduations as the main set of scale numerals and in overlapping relation thereto, the secondary set of scale numerals constituting a continuation for the primary set, in the embodiment illustrated there being forty in the secondary set so that the secondary set runs up to one hundred forty.

I have shown in the accompanying drawings only a portion of the scale graduations and scale indicia or numerals but sufficient to show the relation of the two sets of scale numerals to each other and to the scale graduations.

The adjusting screw 14 is rotatably mounted in the gauge bar and is provided with a hand piece 15 at its outer end and with micrometer gauge indicia 16 at its inner end, its bearing 17 being provided with a pointer 18 operatively associated with the micrometer indicia. The gauge bar is provided with finger guard 19 at its inner end.

I provide main and auxiliary gauge finger slides designated generally by the numerals 20 and 21. The main gauge finger slide is provided with a gauge finger 22, the face 23 of which is aligned with the pointer 24 which is operatively associated with the primary set of scale indicia 12. The secondary gauge finger slide 21 is provided with a pointer 25 which is operatively associated with the secondary scale indicia 13.

The face 26 of the gauge finger 27 is laterally offset relative to the pointer 25 so that it is positioned well beyond the left of the scale graduations when the slide is adjusted to bring its pointer into proper association with the secondary set of gauge numerals. While the gauge bar has only graduations up to 100 pica, the secondary set of scale indicia and this auxiliary gauge finger permits gauging up to 140 pica. Since the gauge bar having only 100 pica scale graduations is to read or be operative up to 140 pica, the secondary set of scale indicia must obviously extend to 140 and must therefore overlap the primary set of scale indicia by 40. In other words, the 100th pica graduation will have the 100 primary scale indicia and the 140 secondary scale indicia associated therewith. If now the secondary gauge finger slide is to accurately measure the distance from the saw or the datum point of the gauge bar to the secondary gauge finger, the face 26 of the secondary gauge finger must be correspondingly laterally offset from the secondary pointer 25 by a distance equal to 40 pica.

The slides 20 and 21 are, as stated, selectively engageable with the gauge bar. In Fig. 1 I have shown both slides in engaged position but it will be understood that ordinarily both would not be so engaged although they might be engaged when the main gauge finger slide is in use for less than full capacity of the gauge bar.

The slides, except for the parts I have indicated, are the same so I will describe only one of them, the slide 21 being detailed. This slide is chambered and is adapted to slidably and detachably engage the gauge bar and is provided with a depending portion 28 which engages the front face 9 of the gauge bar. The sectional feed nut 29 is mounted on the lever 30 pivoted at 31 and provided with a finger piece 32 projecting through the opening 33 in the front of the slide. The coiled spring 34 is engaged at one end on the supporting pin 35 on the slide and at the other end on the pin 36 on the lever so that the feed nut is urged against the screw and the spring acts to urge the slide against the forwardly facing portion of the slideway. This serves to detachably retain the slide upon the gauge bar and permits the slide being lifted from the gauge bar when the nut is disengaged from the feed screw.

The gauge slides may be clamped in adjusted positions by means of the clamping screws 37 which extend through the front of the slide and engage the portions 38 which extend downwardly on the inner side of the front way.

In this embodiment the pivot 31 is provided with a threaded portion 39 threaded into the end of the slide—see Fig. 3, and with a threaded bushing portion 40 which facilitates the assembling and disassembling of these parts and also the accurate supporting of the feed nut against lateral movement which, it will be appreciated, is an important factor in accurate gauging.

As stated, my improvements provide for a wide range of gauging and at the same time maintains compactness and structural simplicity.

I have illustrated and described my invention in a highly practical embodiment thereof. I have not attempted to illustrate or describe certain adaptations which I contemplate as it is believed that this disclosure will enable those skilled in the art to embody or adapt my invention as may be desired.

Having thus described my invention, what I claim as new and desire to secure by Letters Patent, is:

1. In a saw gauge, the combination with a saw table, of a gauge bar slidably mounted on said table, said gauge bar being of upwardly facing channel section and provided with a pica scale and with a primary set of scale numerals and a secondary set of scale numerals constituting a numerical continuation of the primary set of scale numerals, said secondary set of scale numerals being associated with the pica scale and being in lapping relation to a plurality of the scale numerals of the primary set, a feed screw rotatably mounted within the channel of said gauge bar and exposed at the top thereof and provided with an adjusting finger piece at its outer end, a chambered main gauge finger slide slidably and detachably mounted on the flanges of said gauge bar and provided with a pointer operatively associated with the primary scale numerals when the slide is engaged with the gauge bar, a spring biased feed nut pivotally mounted within said slide and provided with a finger piece projecting at the front of the slide, said feed nut being positioned to engage the rear and underside of the feed screw and acting to hold the slide upon the gauge bar, said finger piece facilitating the disengagement of the nut from the feed screw permitting free longitudinal adjustment of the slide on the gauge bar and the removal of the slide from the gauge bar, and an auxiliary gauge finger slide slidably and removably mounted on said gauge bar and provided with a pointer operatively associated with the secondary set of scale numerals when the auxiliary slide is mounted upon the gauge bar, said auxiliary slide being provided with a gauge finger laterally offset from its pointer by a distance exactly equal to the number of pica which said primary and secondary scale indicia overlap numerically and to extend beyond the gauge bar when the auxiliary slide is towards the outer end of its adjustment on the gauge bar, and a spring biased feed nut pivotally mounted within said auxiliary slide and provided with a finger piece projecting at the front of the slide, said feed nut being positioned to engage the rear and underside of the feed screw and acting to hold the slide upon the gauge bar, said finger piece facilitating the disengagement of the nut from the feed screw permitting free longitudinal adjustment of the slide on the gauge bar and the removal of the slide from the gauge bar, both said gauge slides having depending front flanges lapped upon the front flange of said gauge bar and opposing the action of said springs.

2. In a saw gauge, the combination with a saw table, of a gauge bar associated therewith, said gauge bar being provided with a pica scale and with a primary set of scale numerals, and a secondary set of scale numerals constituting a numerical extension of the primary set of scale numerals associated with the pica scale and being in lapping relation to a plurality of the scale numerals of the primary set, a feed screw mounted on said gauge bar, a main gauge finger slide slidably and detachably mounted on said gauge bar and provided with a pointer operatively associated with the primary scale numerals when the slide is engaged with the gauge bar and provided with a feed nut detachably engageable with said feed screw permitting free longitudinal adjustment of the slide on the gauge bar when the nut is disengaged from the screw, and an auxiliary gauge finger slide slidably and removably mounted on said gauge bar and provided with a pointer operatively associated with the secondary set of scale numerals when the auxiliary slide is mounted upon the gauge bar and provided with a feed nut detachably engageable with the feed screw permitting free longitudinal adjustment of the slide on the gauge bar when the nut is disengaged, said auxiliary gauge finger slide being provided with a gauge finger laterally offset from its pointer by a distance exactly equal to the number of pica which said primary and secondary scale indicia overlap numerically and to extend beyond the gauge bar when said auxiliary slide is in one extreme of its adjustment on said bar.

3. A gauge finger slide member adapted to cooperate with a gauge slide bar having an upwardly opening channel shaped cross section and with a slide adjusting screw mounted between the flanges of said bar, said member comprising, a downwardly opening recessed body having front and rear walls adapted to slide upon the flanges of said bar and with a depending portion on one of said walls adapted to lap against the outside of one of said flanges, a lug depending from the inside of said body in lapped relationship with the inside of said one flange, a screw extending between said one wall and said lug and arranged to clamp said one flange between said lug and said depending portion, spaced ears extending into the recess of said body from the wall thereof and defining aligned tapped apertures parallel to the bottom of said front and rear walls, a shouldered pin having an enlarged threaded end received in one of said apertures and with its other end extending between said ears, a bushing threaded in the other of said apertures and supporting the other end of said pin, a lever pivoted on said pin and fixed axially between said bushing and the shoulder of said pin, a half nut on one arm of said lever engageable with said screw, the other arm of said lever extending through an aperture provided therefor in the wall of said body and having a laterally turned finger piece on the outer end thereof, a spring compressed between said one arm of said lever and the inside of said body to urge said half nut against said screw, and a gauge finger projecting from said body.

4. A gauge finger slide member adapted to cooperate with a gauge slide bar having a slide adjusting screw mounted thereon, said member comprising a downwardly opening recessed body having front and rear walls adapted to slide upon said bar, spaced ears extending into the recess of said body from the wall thereof and defining aligned tapped apertures parallel to the bottom of said front and rear walls, a shoulder pin having a threaded end received in one of said apertures and with its other end extending between said ears, a bushing threaded in the other of said apertures and supporting the other end of said pin, a lever pivoted on said pin and fixed axially between said bushing and the shoulder of said pin, a half nut on one arm of said lever engageable with said screw, the other arm of said lever extending through an aperture provided therefor in the wall of said body, a spring compressed between said one arm of said lever and the inside of said body to urge said half nut against said screw, and a gauge finger projecting from said body.

5. The combination of a gauge bar provided with scale graduations and with a primary set of consecutive graduation indicia, a secondary set of scale graduation indicia associated with certain of the graduations of the gauge bar and being a numerical extension of said primary set of graduation indicia but linearly displaced with respect thereto whereby said sets of indicia overlap, and a pair of gauge finger slides selectively engageable with said gauge bar, one slide being provided with a pointer aligned with its gauge finger and operatively associated with the primary set of gauge indicia, the other slide being provided with a pointer operatively associated with said secondary set of indicia and having a gauge finger the face of which is laterally offset relative to its pointer by a distance exactly equal to the distance which said sets of indicia overlap whereby the pointer on said other slide and said secondary set of graduation indicia cooperate to accurately indicate the distance between the face of the gauge finger on said other slide and the zero point of said scale graduations.

6. The combination of a gauge bar provided with scale graduations and a primary set of numerically progressing graduation indicia, a secondary set of scale graduation indicia associated with certain of the graduations of the gauge bar and being a numerical extension of said primary set but linearly displaced with respeit thereto whereby said sets of indicia overlap numerically, and a pair of gauge finger slides selectively engageable with said gauge bar, one slide being provided with a pointer and gauge finger operatively associated with said primary set of gauge indicia, the other slide being provided with a pointer and finger operatively associated with said secondary set of indicia, said other slide having its gauge finger offset from its pointer by a distance exactly equal to the number of scale graduations which said sets of indicia overlap numerically whereby the pointer on said other slide and said secondary set of graduation indicia cooperate to accurately indicate the distance between the face of the gauge finger on said other slide and the zero point of said scale graduations.

LEE C. HAMMOND.

REFERENCES CITED

The following references are of record in the file of this patent:

UNITED STATES PATENTS

| Number | Name | Date |
|---|---|---|
| 1,114,329 | Backert | Oct. 20, 1914 |
| 1,389,432 | DeLos Brainard | Aug. 30, 1921 |
| 2,048,629 | Wallin | July 21, 1936 |
| 2,165,953 | Billker et al. | July 11, 1939 |
| 2,202,434 | Seybold | May 28, 1940 |
| 2,218,470 | Henderson | Oct. 15, 1940 |

FOREIGN PATENTS

| Number | Country | Date |
|---|---|---|
| 486,229 | Germany | Nov. 13, 1929 |